Dec. 28, 1943.  G. C. BEIDLER  2,337,864
FILM TREATING APPARATUS
Filed Sept. 29, 1941  7 Sheets-Sheet 1
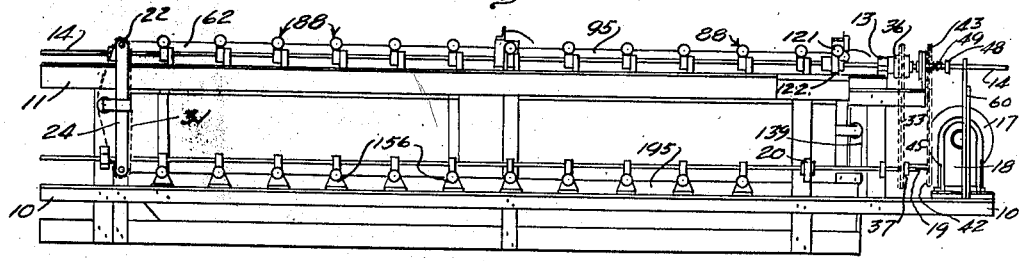
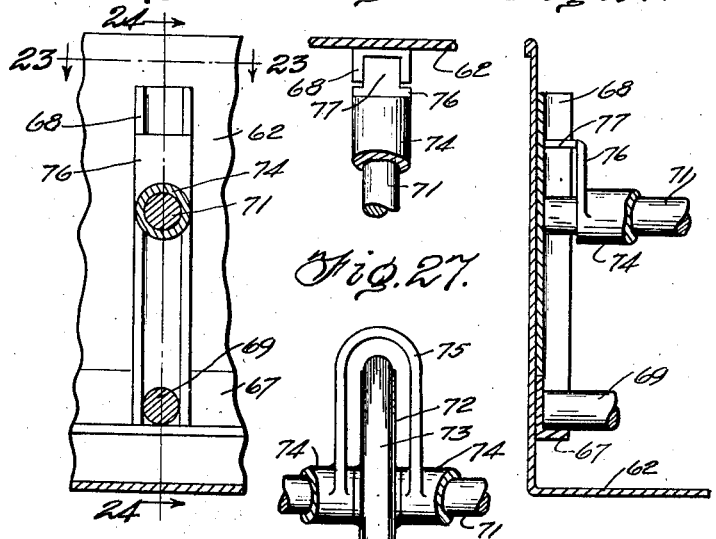
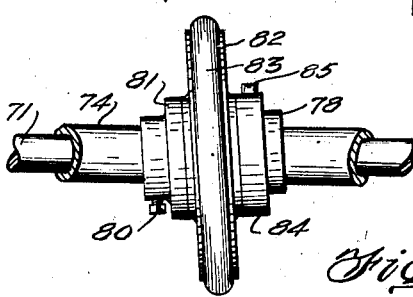
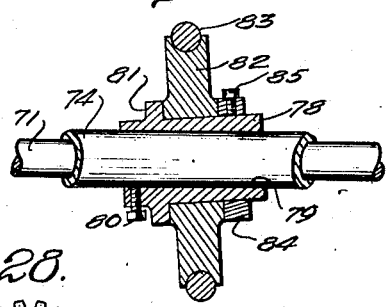
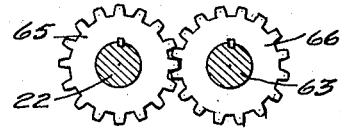
Inventor
George C. Beidler,
By Frank S. Appleman,
Attorney.

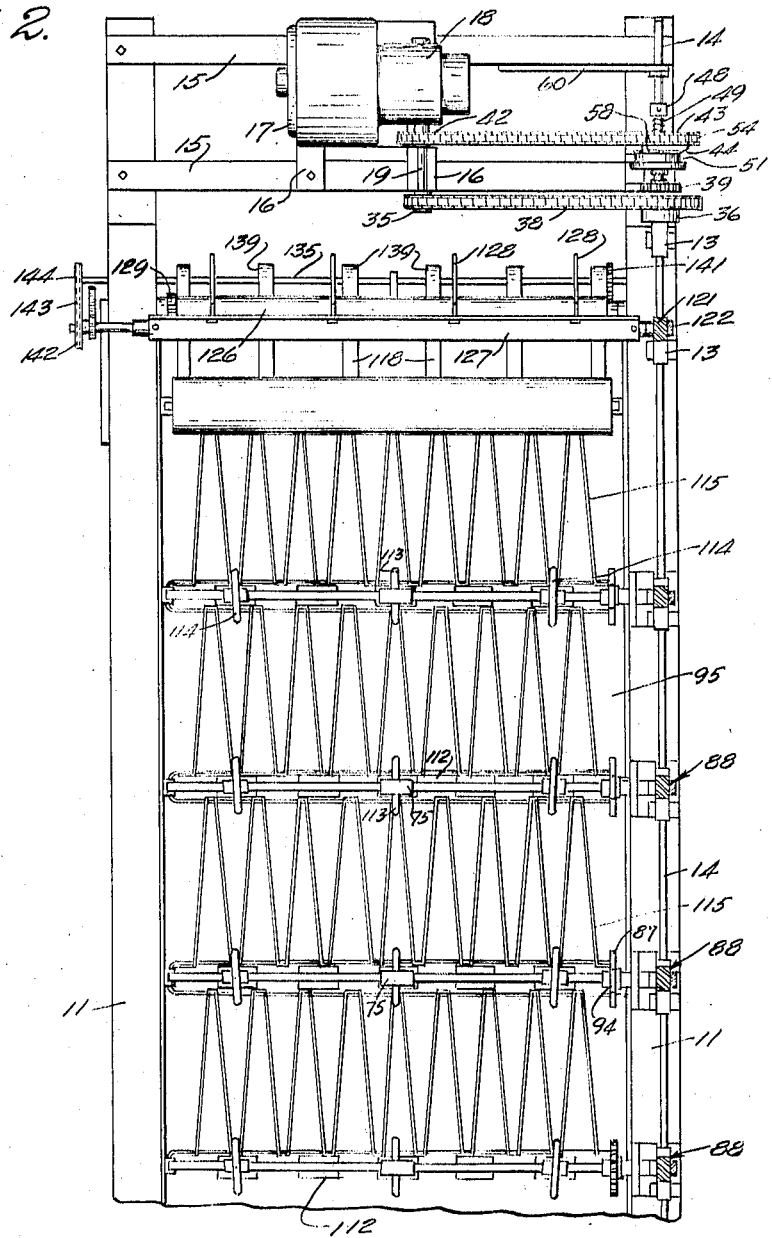

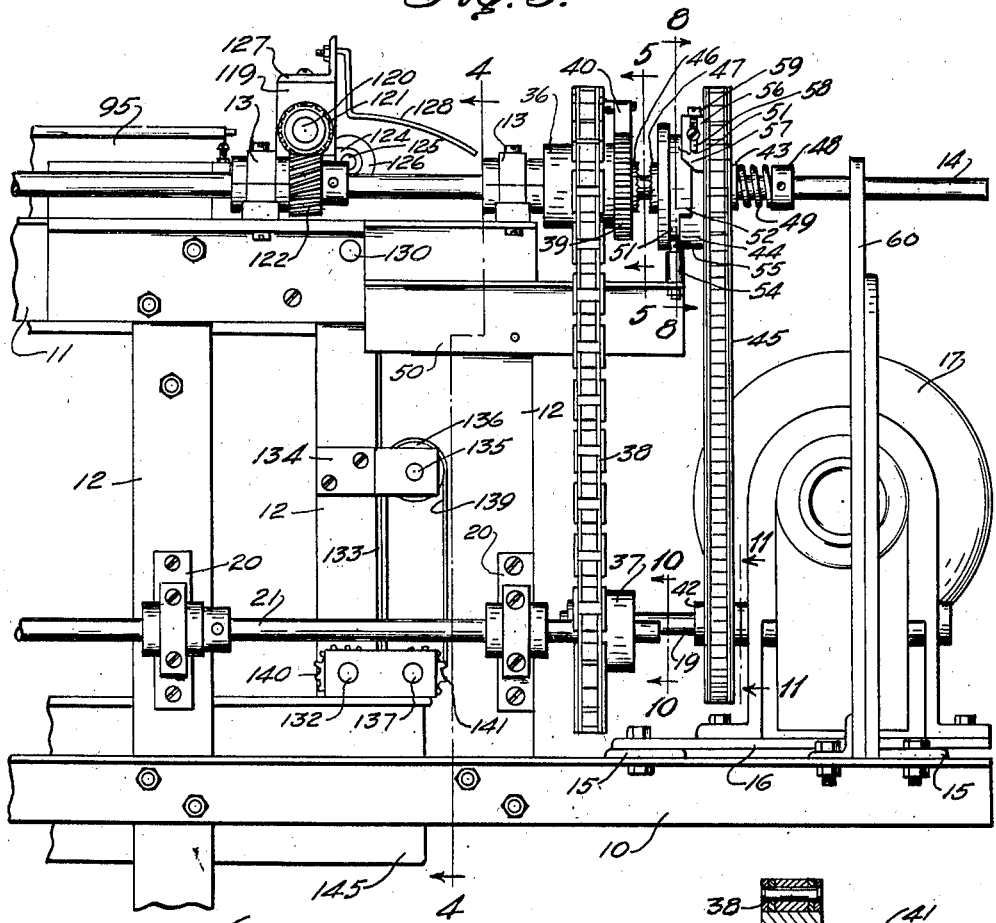

Dec. 28, 1943.  G. C. BEIDLER  2,337,864
FILM TREATING APPARATUS
Filed Sept. 29, 1941  7 Sheets-Sheet 4
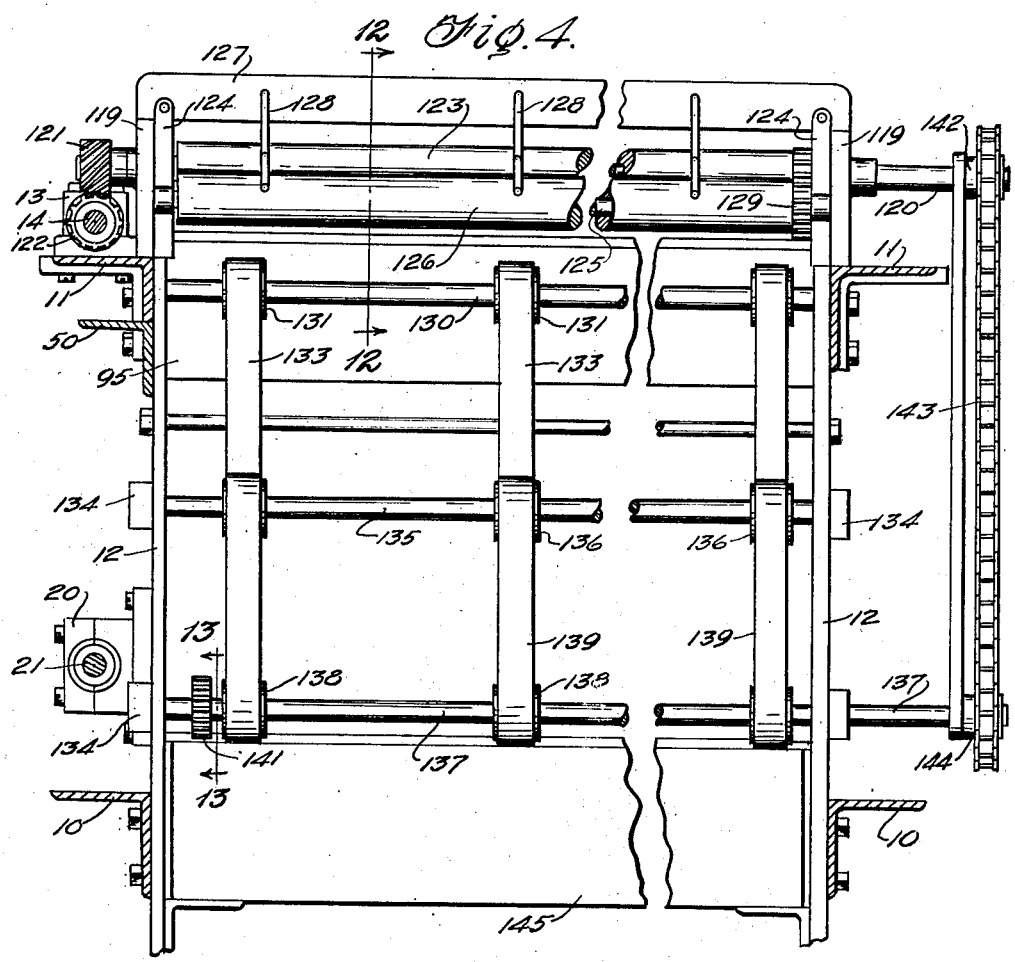
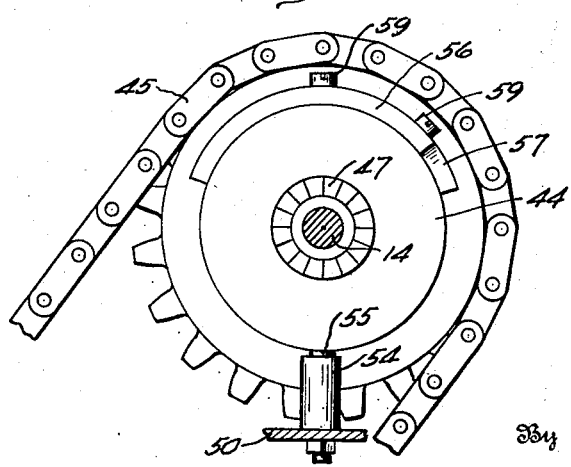
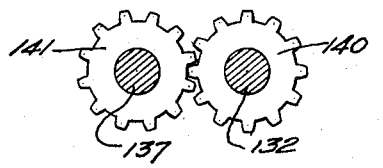
Inventor,
George C. Beidler,
By Frank S. Appleman,
Attorney.

Dec. 28, 1943.  G. C. BEIDLER  2,337,864
FILM TREATING APPARATUS
Filed Sept. 29, 1941  7 Sheets-Sheet 5
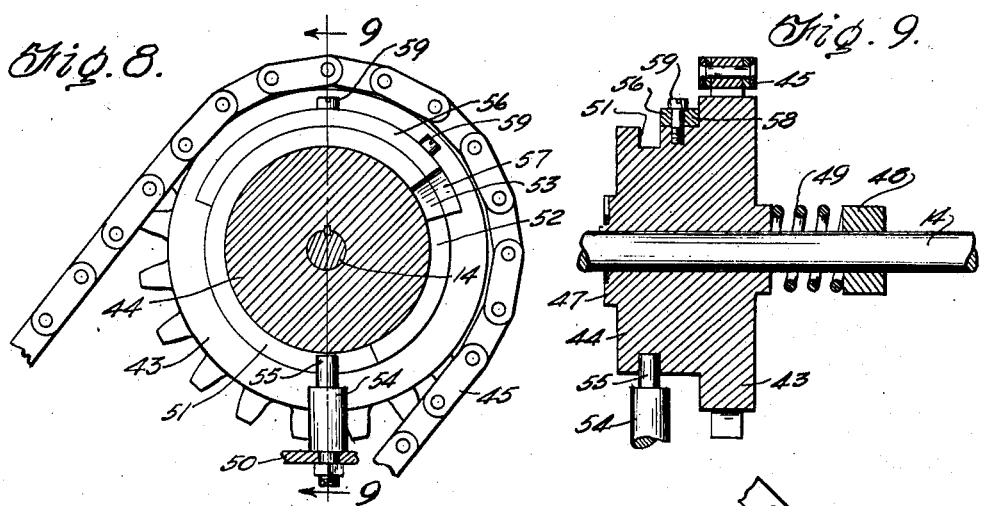
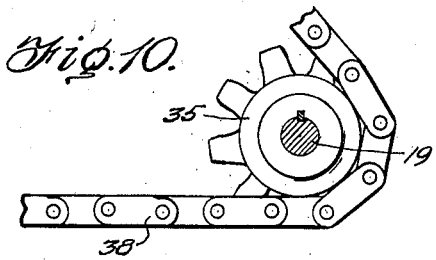
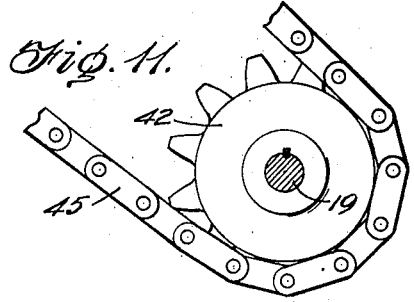
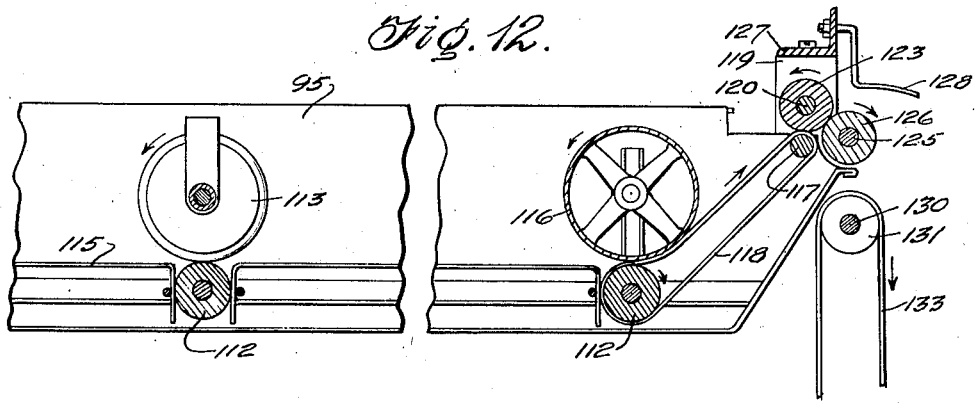
Inventor
George C. Beidler,
By Frank S. Appleman
Attorney

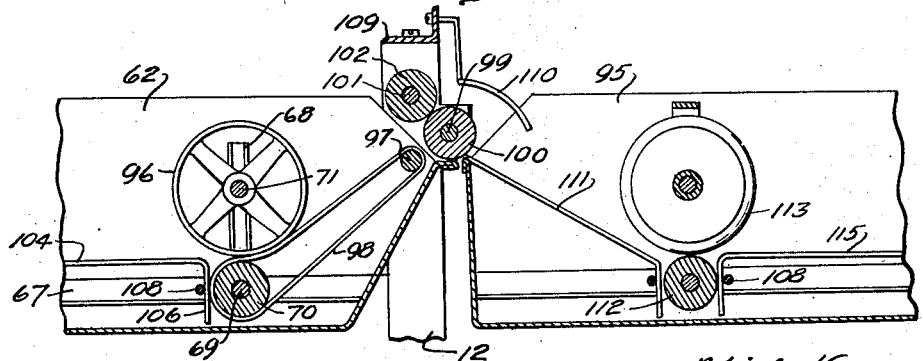
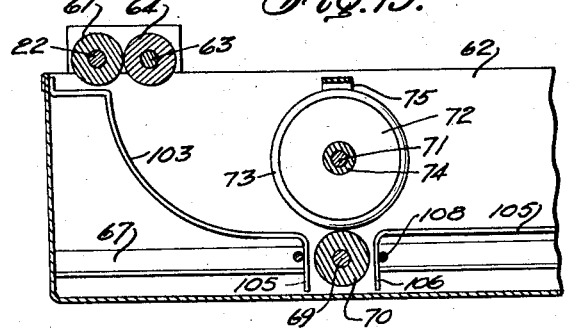
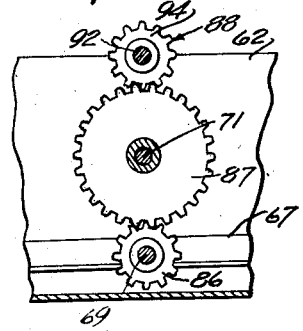
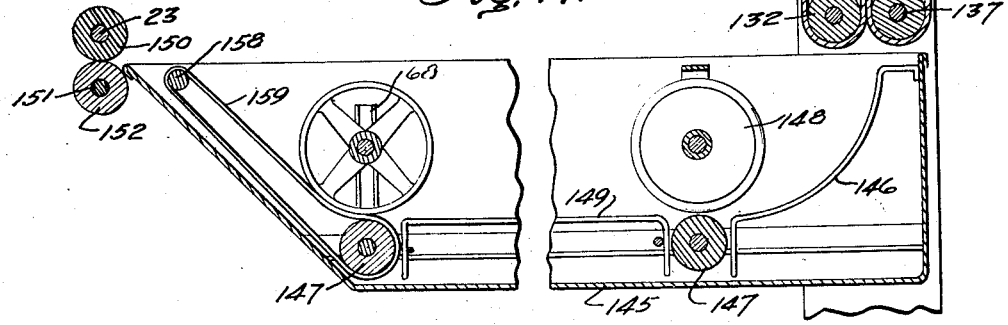

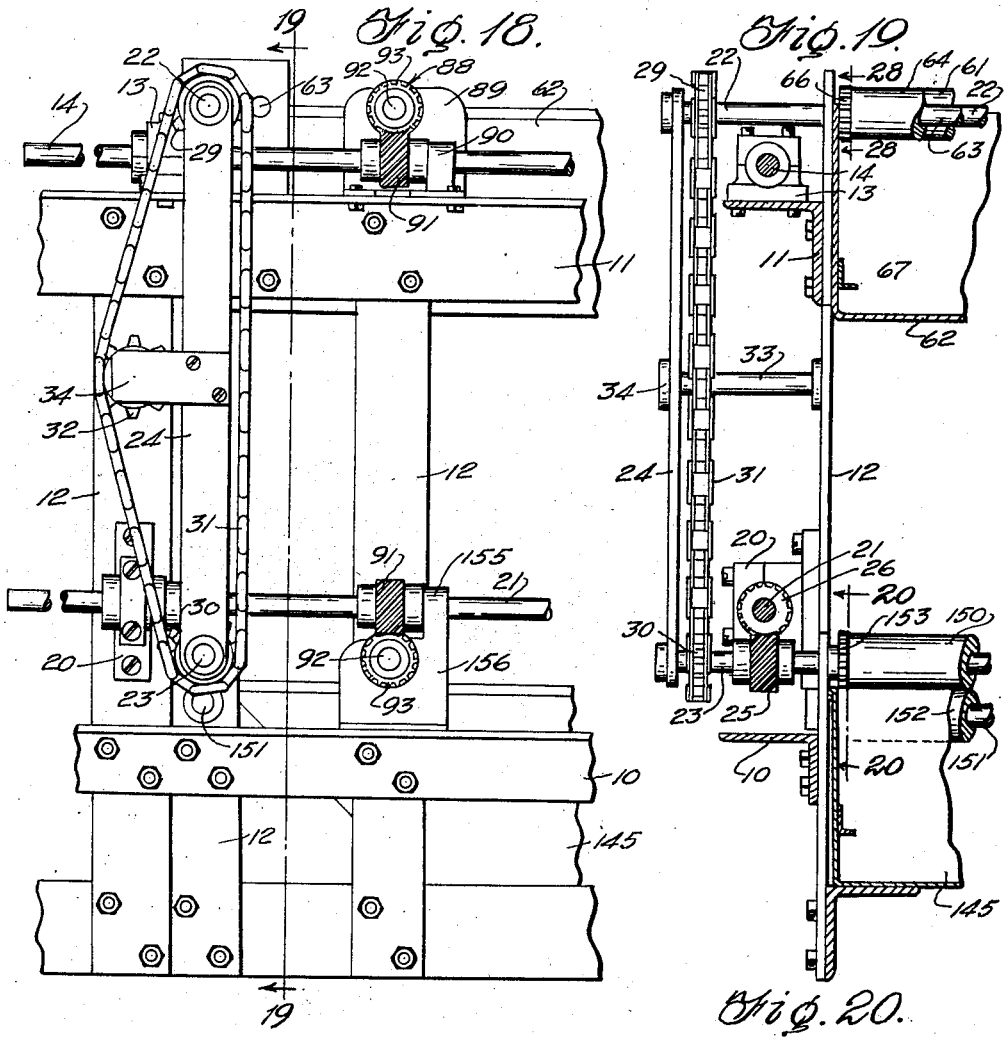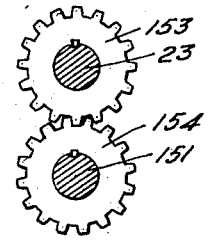

Patented Dec. 28, 1943

2,337,864

UNITED STATES PATENT OFFICE 2,337,864

FILM TREATING APPARATUS

George C. Beidler, Rochester, N. Y.

Application September 29, 1941, Serial No. 412,878

12 Claims. (Cl. 95—94)

This invention relates to the art of photography, and particularly to means and apparatus for treating photographic film and for subjecting exposed film to the action of fluid intended to develop, and successively thereafter subjecting the developed film to the action of fixing fluid and to a washing bath.

It is an object of this invention to provide means for subjecting the film to the action of developing, fixing and washing fluids and at the same time to maintain the film in a flat position while it is being transmitted through the tanks or containers of the developing, fixing and washing fluids. It is well known that when the paper film, which is so widely used in commercial photography, becomes wet, the said film stretches both longitudinally and laterally so that it is an object of this invention to provide means by which the film is subjected to tension laterally of the film and thus is prevented from becoming creased, as would be the case were no provision made for stretching the film laterally to remove liability of its creasing.

It is a further object of the invention to provide means for taking up slackness in the film as it stretches or expands longitudinally and, to that end, means are provided for periodically accelerating the means which convey the film through the receptacles holding the fluid. The apparatus is provided with conveying means which engage the film and, in the present embodiment of the invention, positively driven rotary film engaging rollers or wheels are mounted in the fluid receptacles and the engagement of said rollers or wheels with the film is effective to convey the film from one end of a receptacle to the other, but it has been found that the longitudinal expansion of the film is apt to interfere with the movement of the film, so that it is the purpose of this invention, as stated, to periodically accelerate the conveying action heretofore referred to in order that the increased length of the film may be compensated and the travel of the film through the receptacle may be effected without liability of clogging the movement of the film or transversely creasing the same.

It is the purpose of the inventor to provide a grid or support for the film between the conveying rollers, and it has been found that when so-called "Duplex" film is treated, provision should be made for supporting the film so that when the coated side of the film is in contact with the grid or support, it will not travel over a grid or support having a straight longitudinal supporting surface; and to avoid marking the film that travels over such a longitudinal surface, provision has been made for supporting the film whereby it moves over the grid at an angle to the supporting surfaces of the grid, and these novel grids or supports are suitably located on the bottom of the fluid receptacle and are of such height as to support the film that is being moved by the conveying rollers.

It is a further object of this invention to provide a plurality of receptacles and to associate with them novel means for transferring the film in its travel from one receptacle to another during the developing, fixing and washing steps of the treatment of the film. Several fluid receptacles may be assembled with relation to one another in various ways, but it has been found in practice and in the interests of conservation of space that the receptacles may be superimposed and, to that end, means are provided for transferring the film from an upper receptacle containing the developing fluid to an intermediate receptacle containing the fixing fluid and from thence to a lower receptacle in which the film is subjected to the rinsing operation; and in this development of the machine, provision is made for preventing the loss of the developing fluid or the contamination or weakening of the fixing fluid so that means are provided for compressing the film to dislodge excessive developing fluid in its exit from the developing receptacle, and to express excess fixing fluid prior to transfer of the film to the washing bath.

It is a still further object of this invention to provide novel power transmitting instrumentalities by which a motor is connected to operate shafts which are geared to the conveying and film moving instrumentalities, care being taken to insure that the several conveying rollers or transferring means shall be positively driven and at proper R. P. M.

With the above and other objects in view, as will be presently apparent, the invention consists in general of certain novel details of construction and combinations of parts hereinafter fully described, illustrated in the accompanying drawings and particularly pointed out in the appended claims.

In the accompanying drawings, like characters of reference indicate like parts in the several views and, for the purpose of a clear understanding of the relative positions of the several parts, it will be assumed that the front end of the machine is that receiving the exposed film from the camera common to such devices as that herein disclosed. It will also be assumed that the right side of the machine is that on the right hand of an observer standing at the rear end of the machine and facing toward the front end.

Briefly, the several views shown in the drawings are as follows:

Figure 1 illustrates a side elevation, partly broken away and showing a complete apparatus constructed in accordance with this invention to a small scale;

Figure 2 illustrates a plan view of the rear portion of the apparatus and including the motor drive and a portion of the fixing bath;

Figure 3 illustrates an enlarged elevation showing the left side of the rear portion of the apparatus;

Figure 4 illustrates a fragmentary section on the 4—4 of Figure 3;

Figure 5 illustrates an enlarged detail section on the line 5—5 of Figure 3, looking in the direction indicated by arrows;

Figure 6 illustrates a detail section on the line 6—6 of Figure 5;

Figure 7 illustrates an enlarged detail section on the line 5—5 of Figure 3 but looking in the opposite direction to Figure 5;

Figure 8 illustrates an enlarged detail section on the line 8—8 of Figure 3;

Figure 9 illustrates a section on the line 9—9 of Figure 8;

Figure 10 illustrates an enlarged detail section on the line 10—10 of Figure 3;

Figure 11 illustrates an enlarged detail section on the line 11—11 of Figure 3;

Figure 12 illustrates an enlarged detail section on the line 12—12 of Figure 4, the view being partly broken away;

Figure 13 illustrates an enlarged detail section on the line 13—13 of Figure 4;

Figure 14 illustrates a detail vertical section taken longitudinally through adjacent end portions of the developing and fixing tanks;

Figure 15 illustrates a similar section through the front end portion of the developing tank;

Figure 16 illustrates an enlarged detail showing certain gearing used herein;

Figure 17 illustrates a vertical longitudinal section through the washing tank, the middle portion being broken out;

Figure 18 illustrates an elevation of the left side of the front portion of the apparatus on the same scale as Figure 3;

Figure 19 illustrates a fragmentary section on the line 19—19 of Figure 18;

Figure 20 illustrates an enlarged detail section on the line 20—20 of Figure 19;

Figure 21 illustrates a perspective view of a portion of one of the wire film supports used herein;

Figure 22 illustrates a view partly in elevation and partly in section to show the manner of mounting conveyor shafts in the several tanks of this apparatus;

Figure 23 illustrates a section on the line 23—23 of Figure 22;

Figure 24 illustrates a section on the line 24—24 of Figure 22;

Figure 25 illustrates a detail plan showing one of the side rollers set diagonally to cause lateral tensioning of the film or paper, the view also showing parts adjacent said roller;

Figure 26 illustrates a horizontal axial section of the parts shown in Figure 25;

Figure 27 illustrates an edge elevation of the central roller associated with the roller of Figure 25; and Figure 28 illustrates an enlarged section on the line 28—28 of Figure 19.

In the construction of the apparatus as herein illustrated, there is provided a frame having a pair of oppositely disposed and longitudinally extending lower rails 10 formed of angle iron and a similar but somewhat shorter pair of upper rails 11. The upper and lower rails at each side of the apparatus are connected by vertical frame members 12 of bar metal securely bolted to said rails. Mounted on the left hand upper rail 11 are bearings 13 arranged adjacent the ends of the rail and in these bearings is supported an upper jack shaft 14. At their rear ends the two lower rails are connected by a pair of cross frame members 15 which are themselves connected intermediate their ends by motor supporting members 16. On the members 16 is mounted a motor 17 having a reducing gear of ordinary construction, the casing of which is shown at 18. Through the reducing gear the motor drives a shaft 19 which is parallel to the shaft 14. On certain of the left hand vertical members 12 are fixed bearings 20 wherein is mounted a lower jack shaft 21. Extending transversely above the shaft 14 at the front of the apparatus is an upper cross shaft 22 and a similar lower cross shaft 23 extends transversely of the apparatus below the shaft 21, the shafts 22 and 23 being vertically spaced and parallel. These shafts 22 and 23 project to the left beyond the rails 10 and 11 and their outer ends are connected by a vertical brace bar 24 in the ends of which the shafts are journalled. Between the brace bar 24 and the opposed member 12 the shaft 23 carries a helical gear 25 which meshes with a helical gear 26 fixed on the shaft 21. On the shaft 22 is fixed a sprocket 29 and on the shaft 23 is fixed a sprocket 30 and a chain 31 is trained around these sprockets and also around an idler sprocket 32 carried on a shaft 33 supported by an arm 34 carried by the brace bar 24. By means of the arrangement just described, the shafts 22 and 21 rotate at the same speed.

On the shaft 19 is fixed a drive sprocket 35 preferably having nine teeth. Revolubly mounted on the shaft 14 is a sprocket 36 and on the shaft 21 is fixedly mounted a sprocket 37. Fixed on the shaft 14 adjacent the sprocket 36 is a ratchet 39 which is engaged by a pawl 40 pivoted on the sprocket 36 and urged into said engagement by a spring 41. By means of this arrangement the rotation of the sprocket 36, as shown by the arrow in Figure 5, rotates the shaft 14. However, the shaft 14 and ratchet 39 may rotate in the direction of the arrow faster than the sprocket. On the shaft 19 is also fixed a sprocket 42 preferably having twelve teeth. Loose on the shaft 14 is a sprocket 43 carrying a drum 44 on the face confronting the sprocket 36. The sprockets 36 and 43 have the same number of teeth. A chain 45 is trained around the sprockets 42 and 43. By reason of the teeth on the sprocket 42 being greater in number than the teeth on 35, the sprocket 43 revolves faster than the sprocket 36. Confronting clutch faces 46 and 47 are provided on the ratchet 39 and drum 44. On the shaft 14 is fixed a collar 48 between which and the sprocket 43 is a spring 49 urging the clutch face 47 into engagement with the clutch face 46. When thus engaged the sprocket 43 acts to drive the shaft faster than the sprocket 36 and the ratchet riding freely under the pawl permits this more rapid movement.

In order to provide for control of the engagement of the clutch faces 46 and 47 an extension arm 50 is secured to the left hand rail 11 and the rear end of the arm 50 extends beneath the drum 44. The drum 44 is provided with a circumferential groove 51 having a laterally widened portion 52 with the wall at one end beveled as at 53 so that the groove forms a cam groove. Carried by the arm 50 is a post 54 having a reduced end 55 which engages in the groove 51. With this arrangement each revolution of the sprocket 43 brings the widened portion 52 into position to have the end 55 engage therein. The post 54 is so located that while the end 55 is in the narrow part of the groove the clutch faces 46 and 47 will be held apart as shown in Figure 3, but when the widened portion 52 comes opposite the end 55 the spring 49 pushes the sprocket 43 along the shaft 14 until the clutch face 47 engages the clutch face 46 and the shaft 14 speeds up. The engagement of the bevel face 53 moves the sprocket 43 away from the sprocket 36 against the action of the spring 49 and thus disengages the clutch face 47 from the clutch face 46. It is desirable to control the angular extent of movement of the shaft under the higher speed and to this end there is mounted on the drum 44 an arcuate camming bar 56 having a beveled nose 57. The forward edge of this camming bar (Figure 9) is coincident with the rear edge of the slot 51. Extending longitudinally of the bar 56 is a slot 58 and screws 59 pass through this slot and engage in the drum 44 so that the bar may be adjusted to cover the widened portion 52 to such extent as may be desired. When the bar is thus adjusted to shorten the circumferential effective length of the portion 52 the nose 57 engages the end 55 to open the clutch as described with reference to the bevel 53. By the means thus described the shaft 14 has a normal speed during one part of each revolution and a higher speed during the remainder of such revolution. The rear end of the shaft 14 is supported by a brace 60. All of the parts heretofore described may be termed in general the driving mechanism.

There will now be explained the means for treating and conveying the photographic film. The apparatus of this invention is intended preferably for use with that type of camera wherein the film consists of paper having a sensitized coating wound in a roll and fed therefrom through the camera and then through the apparatus for developing, fixing and washing. The camera and roll are not here shown as the apparatus of the invention starts with the means for feeding the paper into the developing bath. For this purpose the shaft 22 extends through a front feed roller 61 which is thus driven by said shaft. This roller is located over the front end of a developing tank 62. A shaft 63 is spaced to the rear of the shaft 22 and carries a rear feed roller 64 which bears against the roller 61, these rollers being preferably formed of rubber or other elastic material. A gear 65 is fixed on the shaft 22 and a similar gear 66 is fixed on the shaft 63 and meshes with the gear 65 so that the two rollers revolve in unison. Extending horizontally along the inner face of each side wall of the tank 62 is a supporting angle 67. Spaced along the inner face of each side wall are vertical channel shaped shaft guides 68 (Figures 22, 23 and 24) the lower ends of which rest on the angle 67. The guides 68 on one wall are opposite those on the other wall. Extending across the tank 62 between each pair of guides 68 is a lower feed shaft 69 which has its ends engaged in the guides and resting on the angle 67. On each shaft 69 is a series of spaced feed rollers 70, the arrangement of which will be more apparent when the fixing bath is described. Above each shaft is an upper feed roller shaft 71. One of the roller sections 70 is located centrally of each shaft 69 and an upper feed roller body 72 having a rubber tire 73 is fixed on all but one of the shafts 71 to ride on these sections 70. A sleeve 74 is mounted on the shaft 71 carrying the upper feed rollers at each side of the upper roller body 72 and the proximal ends of the two sleeves on each shaft are connected by an upstanding yoke 75. The ends of these sleeves adjacent the guides are provided each with an upstanding arm 76 and each arm has a reduced finger 77 which extends into the respective channel guide 68. By this means the sleeves are held against rotation. Mounted on each sleeve 74 and spaced equally from the yoke 75 is a sleeve 78 having a bore 79 extending diagonally therethrough so that the axis of the sleeve intersects the axis of the shaft 71 diagonally. The sleeve 78 is secured in adjusted position on the sleeve 74 by a set-screw 80. On the sleeve 78 is formed a circumferential rib or flange 81. On the sleeve 78 and bearing against the flange 81 is a freely rotatable roller body 82 having a rubber tire 83 which bears on one of the lower sections 70. A collar 84 is secured on the sleeve 78 by a set screw 85 and holds the body 82 on the sleeve 78. It is to be noted that the arrangement of the sleeves 78 on each shaft 71 is such that one upper feed roller slants in one direction and the other feed roller slants in the opposite direction. These two rollers are thus so inclined that the planes passing through the centers of the tires diverge from front to rear. The side portions of the film or paper pass under these diverging rollers and thus tend to follow the lines of divergence. This action tends to stretch the paper or film laterally. The center upper roller on each shaft 71 rotates in the proper line of movement of the paper or film and thus prevents the paper from moving toward one side or the other of the tank. The conveying of the paper or film is effected principally by the upper central rollers and the coacting sections 70, and, to this end, gearing is used connecting the shafts 69 and 71. Accordingly, on the shaft 69 is fixed adjacent the left end, a gear 86 and on the corresponding end of the shaft 71 is fixed a gear 87 which meshes with the gear 86. The pitch diameters of the gears 86 and 87 equal the respective diameters of the lower and upper rollers. For each of the gears 87 there is provided an individual mechanism connecting each gear 87 with the shaft 14, such mechanism being indicated in general at 88. Each of these mechanisms 88 comprises an L-shaped bracket 89 having a horizontal leg secured to the rail 11 and a vertical leg extending up alongside of the tank 62. On the horizontal leg is formed a bearing 90 supporting the shaft 14 and adjacent this bearing a spiral gear 91 is fixed on the shaft 14. Journalled in the vertical leg of the bracket 89 is a stub shaft 92 on the outer end of which is fixed a spiral gear 93 which meshes with the gear 91. On the inner end of the shaft 92 is fixed a spur gear 94 which meshes with the gear 87. Thus revolution of the shaft 14 causes corresponding revolutions of the shafts 71 and 69. At the rear or delivery end of the tank 62, mechanism is provided for transferring the film or paper to a tank 95 containing the fixing bath and thus termed the fixing tank. In this transfer mechanism the upper rollers are replaced by a drum 96. The rear wall of the tank 62 is of less height than the side walls and just in front of this rear wall is a shaft or roller 97 which is journalled in the side walls of the tank. Around the roller sections 70 and the roller 97 are trained endless bands or belts, one of which is shown at 98 (Figure 14) and, by means of these belts, paper or film passing under the drum 96 is carried up above the top of the rear tank wall. A pair of vertical frame members 12 is located at the rear end of the tank 62 and in these members is journalled a lower delivery roll shaft 99 on which is mounted a delivery roll 100. An upper delivery roll shaft 101 carries a delivery roll 102 which bears on the roll 100, the two rolls being formed of rubber or other elastic material. The shafts 99 and 101 are geared together similar to the shafts 22 and 63 and the shaft 101 is driven by one of the mechanisms 88, this shaft replacing the shaft 92 of such mechanism. The paper or film runs off the belts 98 and passes between the rollers 100 and 102 which act to squeeze the paper between them and thus express most of the developing bath liquid which falls back into the tank 62.

In order to hold the paper or film above the bottom of the tank and guide it to pass properly between the lower and upper feed rollers there is provided at the front end of the tank 62 a series of spaced feed wires curved as at 103 from a point just forward of the plane passing vertically between the rollers 61 and 64 to a point just forward of the roller sections 70, the rear ends of these wires being supported on legs 104 which are of such height that paper passing rearwardly therefrom will engage between the upper and lower feed rollers. Supporting wires are also arranged between each adjacent pair of shafts 69. Each set of these supporting wires consists of a single length of wire (Figure 21) bent to provide zigzag horizontal portions 104 and downwardly extending legs 105 connected in pairs at their lower ends as at 106. The legs are of proper height to pass the paper along on a level with the contacting portions of the upper and lower feed rollers. Cross wires 108 hold these supporting wires in place.

An angle iron 109 connects the upper ends of the pair of members 12 at the rear of tank 62 and deflector wires 110 are carried by this angle iron and are so shaped that paper or film issuing from between the rollers 100 and 102 will be deflected downwardly to engage on guide wires 111. The fixing tank 95 is provided, in the same manner as the tank 62, with lower feed rollers 112, upper central feed rollers 113, these parts being identical with those used in the developing tank and operated in the same manner by mechanisms 88. Supporting wires 115 are also like those in tank 62 and by observing Figure 2 it will be seen that the zigzag arrangement of these wires prevents the paper or film from travelling over the wires in the directions of their lengths as the parts of the wires engaged by the paper always lie diagonally to the direction of movement of said paper. Thus no marks or undeveloped spots are made in the paper. At the delivery end the tank 95 is provided with a drum 116, roller 117 and belts 118, as in tank 62. The construction and interior fittings of the tanks 62 and 95 are thus practically alike. Extending up from the rails 11 at the rear of the tank 95 is a pair of vertical members 119 wherein is journalled a shaft 120 and on the left end of this shaft is a spiral gear 121 which meshes with a spiral gear 122 fixed on the shaft 14. On the shaft 120 is a roller 123. Bearings 124 support a shaft 125 on which is a roller 126 pressing against the roller 123. The upper ends of the members 119 are connected by an angle iron 127 carrying deflector wires 128 to deflect the film or paper issuing from between the rollers 123 and 126 downwardly. Gearing 129 connects the shafts 120 and 125. An upper front belt shaft 130 extends between the rails 11 and carries spaced belt pulleys 131. Certain of the frame members 12 extend below the shaft 130 and support a lower front belt shaft 132 having pulleys corresponding with those on the shaft 130. Belts 133 are trained around the upper and lower pulleys. Brackets 134 are carried by these members 12 and support an upper rear shaft 135 carrying belt pulleys 136. Below the shaft 135 is a shaft 137 carrying pulleys 138 and belts 139 are trained around the pulleys 136 and 138. A gear 140 is fixed on shaft 132 and meshes with a gear 141 fixed on shaft 137 so that the shafts 132 and 137 rotate and the belts 133 and 139 move in unison. On the shaft 120 is fixed a sprocket 142 which is connected by a chain 143 with a sprocket 144 fixed on the shaft 137. Thus rotation of the shaft 120 effects driving of the belts 133 and 139. As the paper or film passes the rollers 123 and 126 and moves downwardly, it is caught between the belts 133 and 139 the lower ends of which lie over the rear end portion of a washing tank 145 which is alike in interior construction and equipment to the other tanks having guide wires 146, lower feed rollers 147, upper feed rollers 148 and carrier wires 149. The tank 145 extends below the tanks 95 and 62 from the rear end of tank 95 to the front end of the tank 62 so that the shaft 23 lies at the front or delivery end of the tank 145. On the shaft 23 is mounted a roller 150. Below the shaft 23 is a shaft 151 carrying a roller 152 which presses against the roller 150, these two rollers constituting the final delivery rollers of the apparatus. On the shaft 23 is a gear 153 which meshes with a gear 154 fixed on the shaft 151 to cause these shafts to revolve in unison. Due to the shaft 21 being higher than the tank 145 the mechanism 88 must be slightly modified to drive the rollers from shaft 21. The modification only exists in the form of the bracket, a bearing 155 for the shaft 21 being formed on the vertical leg of a bracket 156 mounted on the rail 10.

From the foregoing description it will be seen that the paper or film enters the apparatus between the rollers 61 and 64, passes through the developer bath out between the rollers 100 and 102 into the fixing bath and out between the rollers 123 and 126, down between the belts 133 and 139 into the washing bath, through the latter and out of the apparatus between the rollers 150 and 152. During its passage through each bath, the paper or film passes under diagonally disposed rollers tending to stretch it laterally and is thus kept smooth between its sides. Also, due to the alternate increase and decrease of the speed of the shaft 14, the paper is fed through the several baths in what would appear to be a somewhat jerky manner but actually the paper moves smoothly as the rollers slip when the slack caused by expansion is taken up and which has been found by experience to effectually take up any longitudinal slackness between successive pairs of feed rollers so that no creases are produced in the entire operation.

It will now be seen that the invention provides a machine that will handle either simplex (coated on one side) or duplex (coated on both sides) paper in a continuous strip or in sheets, as desired, when provided with a suitable cutting device and that it can also be operated with or without a camera or other exposing device.

I claim:

1. In apparatus for subjecting a web to treatment in a bath, a tank for containing the bath, means in the tank engaging the web and causing it to move through the tank, other means associated with the first means and engaging lateral portions of the web, said other means being arranged to hold the web within the bath and to urge said lateral portions along diverging paths, and driving mechanism for the first means having constantly alternating relatively slow and fast speeds.

2. In apparatus for subjecting a web to treatment in a bath, a tank for containing the bath, feed rollers in the tank over which the web passes, idler rollers beneath which the web passes to be held beneath the surface of the bath, said idler rollers being arranged in pairs with each pair engaging opposite side portions of the web, said idler rollers being mounted to revolve in planes diverging from the direction of lineal travel of the web, and driving mechanism for the feed rollers and having constantly alternating relatively slow and fast speeds.

3. In apparatus for subjecting a web to treatment in a bath, an elongated tank for holding the bath, a pair of feed rollers at one end of the tank positioned to grip the web between them for feeding it into the tank, a pair of similar web gripping rollers at the other end of the tank for feeding the web out of the tank, means in the tank between said pairs of rollers for engaging the edge portions of the web and laterally tensioning said web, said means being positioned to hold said web submerged in said bath, and means driving said feed rollers in unison, said last means being arranged for continuously alternating the speed of said feed rollers between relatively slow and relatively fast speeds.

4. In apparatus for subjecting a web to treatment in a bath, an elongated tank for holding the bath, a pair of feed rollers at one end of the tank positioned to grip the web between them for feeding it into the tank, a pair of similar web gripping rollers at the other end of the tank for feeding the web out of the tank, lower feed rollers extending transversely of the tank and spaced longitudinally along the tank, said lower rollers supporting the web during its passage through said tank, other rollers arranged in sets above the lower feed rollers to press the web thereagainst, certain of the rollers in each of said sets engaging the marginal portions of the web and arranged to revolve in diverging planes for laterally tensioning the web, and means driving said feed rollers in unison.

5. In apparatus for subjecting a web to treatment in a bath, an elongated tank for holding the bath, a pair of feed rollers at one end of the tank positioned to grip the web between them for feeding it into the tank, a pair of similar web gripping rollers at the other end of the tank for feeding the web out of the tank, lower feed rollers extending transversely of the tank and spaced longitudinally along the tank, said lower rollers supporting the web during its passage through said tank, other rollers arranged in sets above the lower feed rollers to press the web thereagainst, certain of the rollers in each of said sets engaging the marginal portions of the web and arranged to revolve in diverging planes for laterally tensioning the web, and means driving said feed rollers in unison, said last means being arranged for continuously alternating the speed of said feed rollers between relatively slow and relatively fast speeds.

6. In web treating apparatus of the kind described, a tank through which the web passes, feed rollers extending transversely of the tank and spaced therealong, means to drive said rollers, and other means for supporting the web in its passage from one roller to the next, each comprising a single length of wire of generally zigzag form with the converging portions extending downwardly to form legs resting on the bottom of the tank.

7. In apparatus for subjecting a web to treatment in a bath, an elongated tank for holding the bath, a pair of feed rollers at one end of the tank positioned to grip the web between them for feeding it into the tank, a pair of similar web gripping rollers at the other end of the tank for feeding the web out of the tank, lower feed rollers extending transversely of the tank and spaced longitudinally along the tank, said lower rollers supporting the web during its passage through said tank, means for supporting the web in its passage from one of said lower rollers to the next and including diagonally disposed web supporting elements, other rollers arranged in sets above the lower feed rollers to press the web thereagainst, certain of the rollers in each of said sets engaging the marginal portions of the web and arranged to revolve in diverging planes for laterally tensioning the web, and means driving said feed rollers in unison.

8. In apparatus for subjecting a web to treatment in a bath, an elongated tank for holding the bath, a pair of feed rollers at one end of the tank positioned to grip the web between them for feeding it into the tank, a pair of similar web gripping rollers at the other end of the tank for feeding the web out of the tank, lower feed rollers extending transversely of the tank and spaced longitudinally along the tank, said lower rollers supporting the web during its passage through said tank, means for supporting the web in its passage from one of said lower rollers to the next and including diagonally disposed web supporting elements, other rollers arranged in sets above the lower feed rollers to press the web thereagainst, certain of the rollers in each of said sets engaging the marginal portions of the web and arranged to revolve in diverging planes for laterally tensioning the web, and means driving said feed rollers in unison, said last means being arranged for continuously alternating the speed of said feed rollers between relatively slow and relatively fast speeds.

9. In a photographic film treating apparatus, a developing tank, a fixing tank alined therewith, a washing tank located below said tanks, means for feeding an exposed web into the front end of the developing tank, other means at the junction of said developing and fixing tanks for feeding the web from the developing tank and into the fixing tank, means for feeding the web from the rear end of the fixing tank and down into the washing tank, means for feeding the web from the washing tank, means in each of said tanks for laterally tensioning the web as it passes through the tank and for holding the web submerged in the bath, and means to drive said feeding means in unison, said last means being arranged for continuously alternating the speed of said feed rollers between relatively slow and relatively fast speeds.

10. In a photographic film treating apparatus, a developing tank, a fixing tank alined therewith, a washing tank located below said tanks, means for feeding an exposed web into the front end of the developing tank, other means at the junction of said developing and fixing tanks for feeding the web from the developing tank and into the fixing tank, means for feeding the web from the rear end of the fixing tank and down into the washing tank, means for feeding the web from the washing tank, spaced feed rollers in each tank supporting the web between the tank ends, divergingly disposed rollers in each tank engaging on the web and laterally tensioning said web as it passes through the tank, and means supporting the web in its passage from one feed roller in a tank to the next in the same tank and including diagonally disposed web supporting elements.

11. In a photographic film treating apparatus, a developing tank, a fixing tank alined therewith, a washing tank located below said tanks, means for feeding an exposed web into the front end of the developing tank, other means at the junction of said developing and fixing tanks for feeding the web from the developing tank and into the fixing tank, means for feeding the web from the rear end of the fixing tank and down into the washing tank, means for feeding the web from the washing tank, spaced feed rollers in each tank supporting the web between the tank ends, divergingly disposed rollers in each tank engaging on the web and laterally tensioning said web as it passes through the tank, means supporting the web in its passage from one feed roller in a tank to the next in the same tank and including diagonally disposed web supporting elements, and means to drive all of said feeding means and feed rollers.

12. In a photographic film treating apparatus, a developing tank, a fixing tank alined therewith, a washing tank located below said tanks, means for feeding an exposed web into the front end of the developing tank, other means at the junction of said developing and fixing tanks for feeding the web from the developing tank and into the fixing tank, means for feeding the web from the rear end of the fixing tank and down into the washing tank, means for feeding the web from the washing tank, spaced feed rollers in each tank supporting the web between the tank ends, divergingly disposed rollers in each tank engaging on the web and laterally tensioning said web as it passes through the tank, means supporting the web in its passage from one feed roller in a tank to the next in the same tank and including diagonally disposed web supporting elements, and means to drive all of said feeding means and feed rollers, said last means being arranged for continuously alternating the speed of said feed rollers between relatively slow and relatively fast speeds.

GEORGE C. BEIDLER.